US012617259B2

(12) United States Patent
Shirao

(10) Patent No.: US 12,617,259 B2
(45) Date of Patent: May 5, 2026

(54) FRAME STRUCTURE

(71) Applicant: ISUZU MOTORS LIMITED, Yokohama (JP)

(72) Inventor: Shin Shirao, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 306 days.

(21) Appl. No.: 18/234,565

(22) Filed: Aug. 16, 2023

(65) Prior Publication Data

US 2024/0100930 A1 Mar. 28, 2024

(30) Foreign Application Priority Data

Sep. 26, 2022 (JP) ................................. 2022-153156

(51) Int. Cl.
*B60K 1/04* (2019.01)
*B60L 50/60* (2019.01)
*B60L 53/80* (2019.01)
*B60R 16/04* (2006.01)

(52) U.S. Cl.
CPC ................ *B60K 1/04* (2013.01); *B60L 50/66* (2019.02); *B60L 53/80* (2019.02); *B60R 16/04* (2013.01)

(58) Field of Classification Search
CPC .... B60K 2001/0461; B60K 2001/0494; B60L 53/80
See application file for complete search history.

(56) References Cited

U.S. PATENT DOCUMENTS

| | | | | |
|---|---|---|---|---|
| 3,838,745 A | * | 10/1974 | Kappei | ................... B60L 53/80 |
| | | | | 180/68.5 |
| 2005/0278920 A1 | | 12/2005 | Bogelein | |
| 2011/0198137 A1 | * | 8/2011 | De Paschoal | ........... B60G 3/20 |
| | | | | 280/124.135 |
| 2013/0197734 A1 | | 8/2013 | Okura | |

FOREIGN PATENT DOCUMENTS

| | | |
|---|---|---|
| CN | 103241111 A | 8/2013 |
| DE | 19956623 A1 | 6/2001 |
| DE | 102004029410 A1 | 1/2006 |
| FR | 2428537 A1 | 1/1980 |
| FR | 2685547 A1 | 6/1993 |
| FR | 2828858 A1 | 2/2003 |
| JP | 2003226142 A | 8/2003 |
| JP | 2012075212 A | 4/2012 |
| JP | 2013018385 A | 1/2013 |
| JP | 2018103765 A | 7/2018 |
| WO | WO-2015158934 A1 * | 10/2015 ............... B60K 1/04 |

OTHER PUBLICATIONS

Translation of WO-2015158934-A1 (Year: 2015).*

* cited by examiner

*Primary Examiner* — Katy M Ebner
(74) *Attorney, Agent, or Firm* — The Roy Gross Law Firm, LLC; Roy D. Gross

(57) ABSTRACT
A frame structure of an electric powered vehicle is for supporting a battery of the electric powered vehicle in which a frame constitutes a chassis, and the frame structure of the electric powered vehicle includes: a front slide rail that is provided on the frame between a front wheel and a rear wheel of the electric powered vehicle over a vehicle width direction and guides and supports a front end side of a battery; and a rear slide rail that is provided on the frame between the front wheel and the rear wheel of the electric powered vehicle over the vehicle width direction and guides and supports a rear end side of the battery.

2 Claims, 6 Drawing Sheets

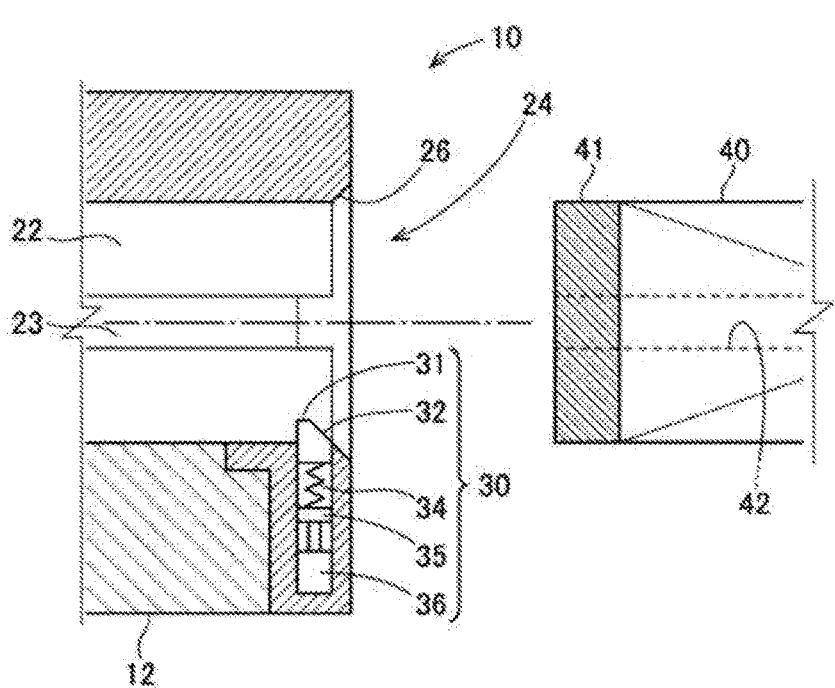
FIG. 4A
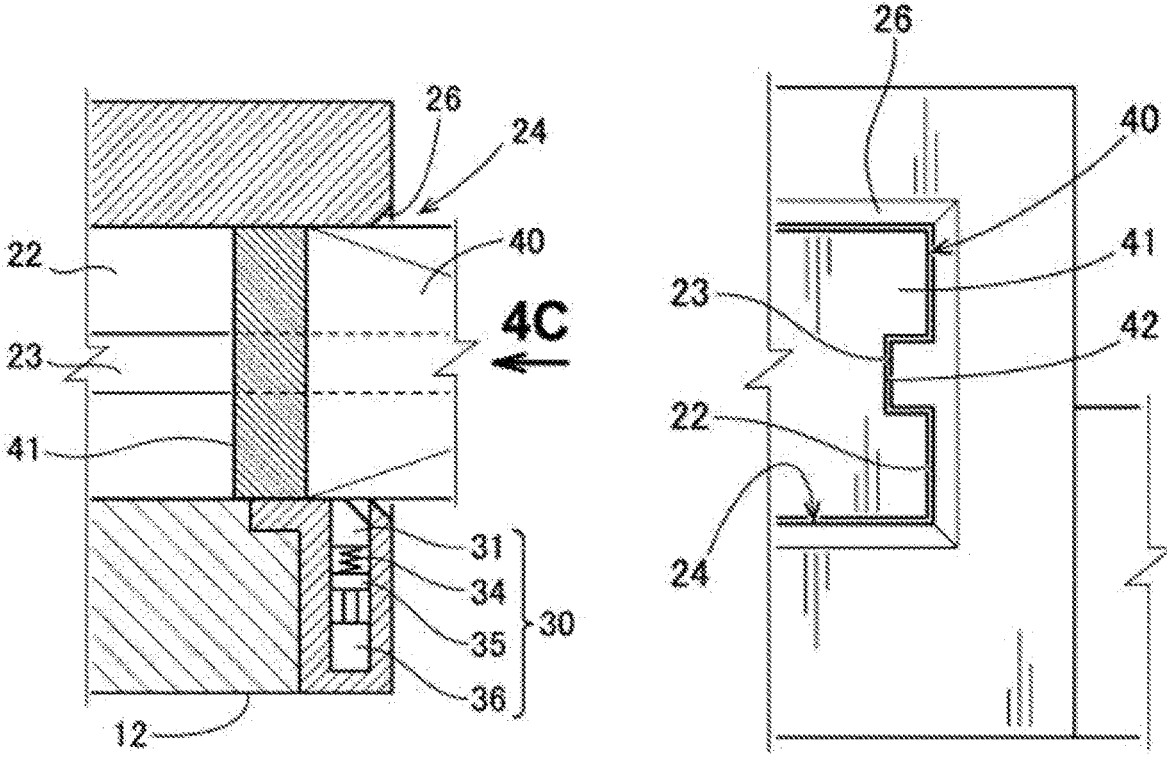
FIG. 4B
FIG. 4C

FRAME STRUCTURE

CROSS REFERENCE TO RELATED APPLICATIONS

This application is entitled to the benefit of Japanese Patent Application No. 2022-153156, filed on Sep. 26, 2022, the disclosure of which including the specification, drawings and abstract is incorporated herein by reference in its entirety.

TECHNICAL FIELD

The present disclosure relates to a frame structure for supporting a battery of an electric powered vehicle in which the battery of an electric motor for traveling is replaceably mounted.

BACKGROUND ART

In recent years, electric and electrified vehicles (hereinafter, referred to as electric powered vehicles) such as an electric vehicle (EV) using only a motor as a driving source or a hybrid electric vehicle (HEV) using an engine and a motor as driving sources have been developed in terms of reducing environmental loads in commercial vehicles such as automobiles and trucks. Such electric powered vehicles are equipped with large-capacity batteries for operating motors.

However, a battery with a large capacity needs a long time to be charged once a state of charge of the battery is reduced. Meanwhile, as techniques for replacing a battery in an electric powered vehicle, the techniques disclosed in Patent Literature (hereinafter, referred to as PTL) 1, PTL 2, and PTL 3 are known.

In the technique of PTL 1, a battery is mounted in a bottom portion of a vehicle body of an electric powered vehicle. At the time of battery replacement, a battery having a low state of charge is removed from the bottom side and set aside using a forklift truck or the like while the vehicle is lifted, or using a dedicated battery replacement device or the like, and a charged battery is attached similarly using the battery replacement device or the like.

The technique of PTL 2 is for an electric powered vehicle of a four-wheel scooter type, and a battery is mounted under a seat, which is a central portion of the vehicle. At the time of battery replacement, a battery having a low state of charge is removed from the left side and set aside using a lifting platform trolley or the like, and a charged battery is attached from the left side similarly using the lifting platform trolley or the like.

The technique of PTL 3 is for a truck-type electric powered vehicle, and a battery is mounted under a van body, which is a lateral lower portion of the vehicle. Two batteries are held in two respective holding brackets placed in two stages of the upper and lower stages, and at the time of battery replacement, a battery having a low state of charge is removed from the lower side of the vehicle together with the holding bracket while being held by the holding bracket, and a charged battery is set on the holding bracket and attached to the lower side of the vehicle together with the holding bracket.

CITATION LIST

Patent Literature

PTL 1
  Japanese Patent Application Laid-Open No. 2012-75212

PTL 2
  Japanese Patent Application Laid-Open No. 2013-18385
PTL 3
  Japanese Patent Application Laid-Open No. 2018-103765

SUMMARY OF INVENTION

Technical Problem

However, the techniques of PTLs 1, 2, and 3 all require a step of removing and setting aside a battery having a low state of charge, which reduces the work efficiency of battery replacement.

The present disclosure has been made in view of the above point, and an object of the present disclosure is to provide a frame structure capable of enhancing the work efficiency of battery replacement.

Solution to Problem

In order to achieve the above-described object, a frame structure in the present disclosure includes: a front slide rail that is provided on a frame of an electric powered vehicle between a front wheel and a rear wheel of the electric powered vehicle over a vehicle width direction and supports a front end side of a battery; and a rear slide rail that is provided on the frame between the front wheel and the rear wheel of the electric powered vehicle over the vehicle width direction and supports a rear end side of the battery, in which the battery is replaced by inserting the battery for replacement from one end side of the front slide rail and the rear slide rail and pushing out the battery to be replaced from the other end side of the front slide rail and the rear slide rail.

According to this configuration, the frame structure includes the front slide rail that is provided on the frame between the front wheel and the rear wheel of the electric powered vehicle over the vehicle width direction and guides and supports the front end side of the battery, and the rear slide rail that guides and supports the rear end side of the battery, so that the battery is replaceable through the front slide rail and the rear slide rail. Further, a charged battery for replacement (a replacing battery) is inserted from one end side of the front slide rail and the rear slide rail, and a battery (a battery to be replaced) that has a low state of charge and is to be replaced is pushed out from the other end side of the front side rail and the rear side rail, so that the battery can be replaced. Accordingly, insertion of the charged battery and removing of the battery having a low power storage rata can be performed simultaneously, and thus the battery is replaced one after another, which reduces the number of processes of battery replacement and enhances the work efficiency of battery replacement.

Further, standardizing the front slide rail and the rear slide rail in various types of electric powered vehicles allows the front slide rail and the rear slide rail to be shared and used in various types of electric powered vehicles. Thus, the battery capacity is not fixed, and the wheel base of the vehicle can be adjusted by changing the size (capacity) of the battery.

Preferably, a battery reinforcement frame for reinforcing the battery is provided on both ends of the battery in the vehicle width direction.

According to this configuration, the rigidity of the battery can be enhanced by the battery reinforcement frame, and the battery can be easily inserted into the front slide rail and the rear slide rail, so that the work efficiency of battery replacement can be enhanced. Further, the battery reinforcement frame is provided on both sides of the battery in the vehicle width direction so as to extend in the vehicle front-rear direction, which enhances the rigidity in the front-rear direction to reinforce the rigidity of the frame, and the rigidity in the entire vehicle front-rear direction can also be enhanced. That is, the battery is integrally structured with the frame, and the battery (the case of the battery pack) also serves as a strength member of the frame, so that the strength (rigidity) of the frame can be enhanced.

Preferably, a guide portion extending outward in the vehicle front-rear direction and height direction to guide the battery is provided on the end portion of the front slide rail and the rear slide rail.

According to this configuration, the guide portion is provided on the end portion of the front slide rail and the rear slide rail and extends outward in the vehicle front-rear direction and height direction to guide the battery, so that even a large battery for a driving motor can be guided by the guide portion and easily inserted between the front slide rail and the rear slide rail. Thus, the work efficiency of battery replacement can be enhanced.

Preferably, a stopper mechanism is provided on the end portion side of the front slide rail and the rear slide rail in the vehicle width direction, or in the end portion of the battery in the vehicle width direction, for restricting the movement of the battery so that the battery inserted at the time of battery replacement does not come out.

According to this configuration, the stopper mechanism for restricting the movement is provided on the end portion side of the front slide rail and the rear slide rail in the vehicle width direction, or in the end portion of the battery in the vehicle width direction, so that it is possible to avoid coming out of the battery inserted during battery replacement and to easily replace the battery. Thus, the work efficiency of battery replacement can be enhanced.

Advantageous Effects of Invention

According to the present disclosure, it is possible to provide a frame structure capable of enhancing the work efficiency of battery replacement.

BRIEF DESCRIPTION OF DRAWINGS

FIG. 4A is a diagram for describing a state before insertion of a charged battery according to an embodiment, FIG. 4B illustrates an operation on the entrance side at the time of insertion of the charged battery, and FIG. 4C is a view on arrow 4C in FIG. 4B;

DESCRIPTION OF EMBODIMENTS

An embodiment of the present disclosure will be described below with reference to the accompanying drawings. Note that the drawings conceptually (schematically) illustrate a schematic configuration of an exemplary frame structure of an electric powered vehicle according to the present embodiment. Further, the directions "front (Fr)," "rear (Rr)," "left (Le)," "right (Ri)," "up (Up)," and "down (Down)" follow the directions viewed from the driver.

Figure 1:
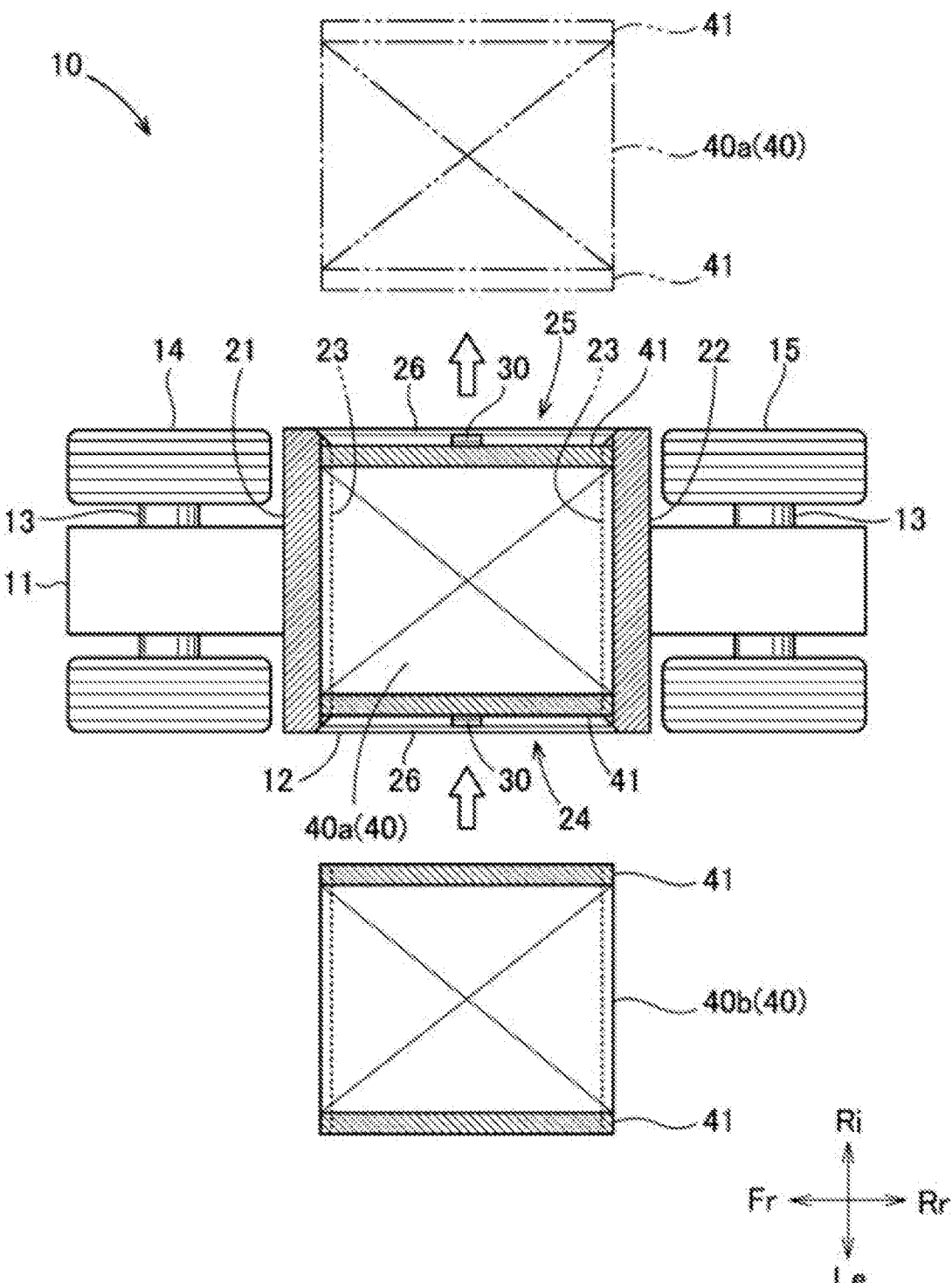
FIG. 1 illustrates an exemplary frame structure and battery replacement according to the present invention.
Figure 2A:
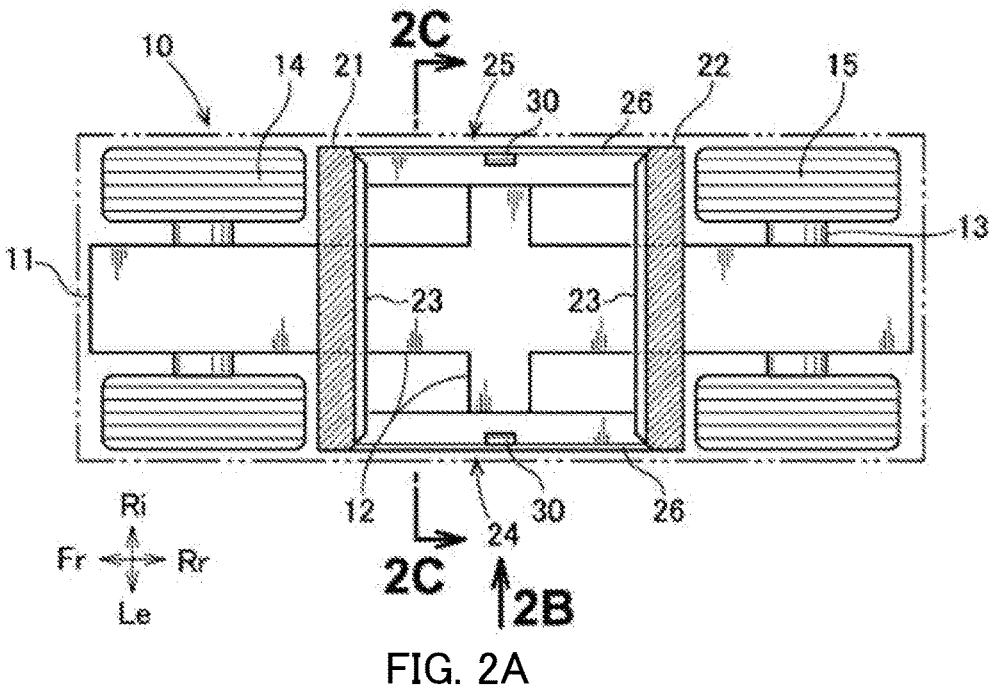
FIG. 2A is a partial cross-sectional view in a plan view of the frame structure in FIG. 1.
Figure 2B:
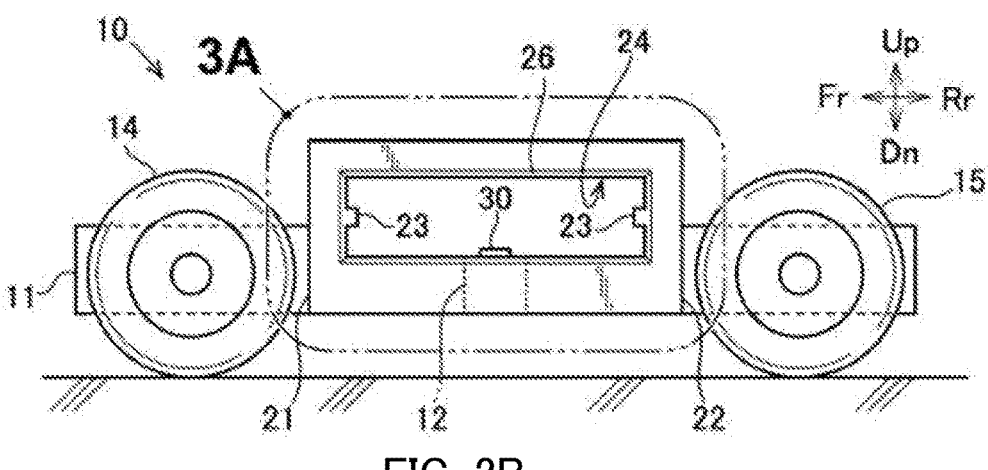
FIG. 2B is a view on arrow 2B in FIG. 2A.
Figure 2C:
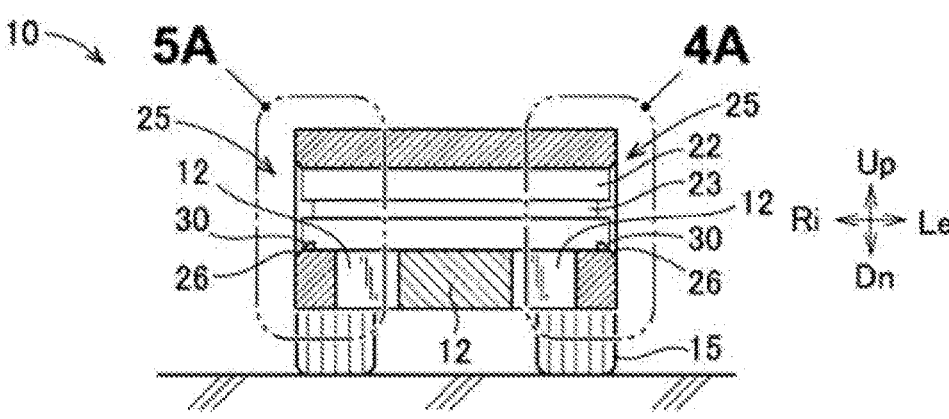
FIG. 2C is a cross-sectional view taken along line 2C-2C in FIG. 2A.
Figure 3A:
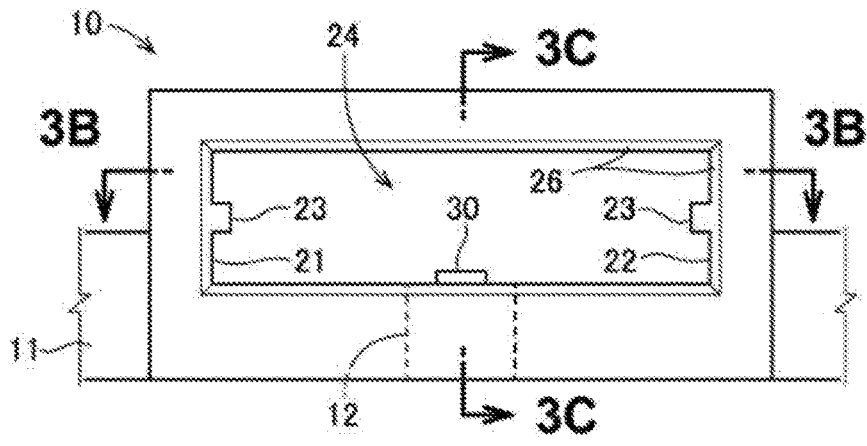
FIG. 3A is an enlarged view of 3A in FIG. 2B.
Figure 3B:
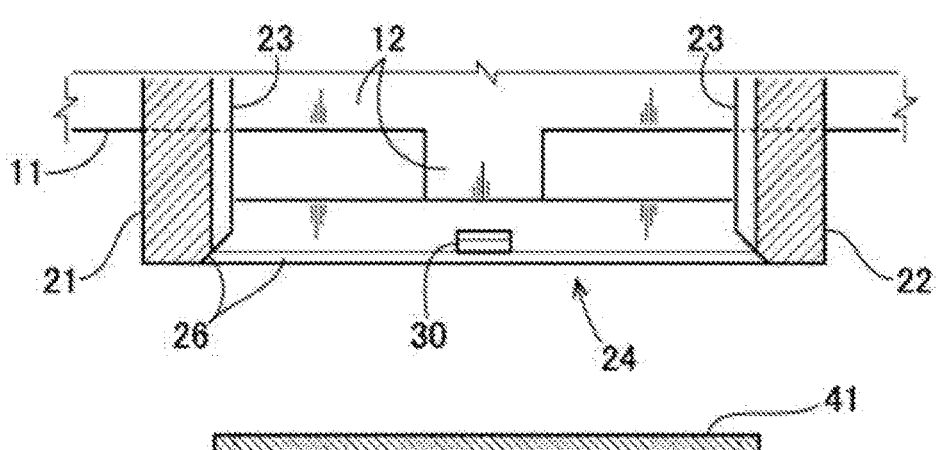
FIG. 3B is a cross-sectional view taken along line 3B-3B in FIG. 3A.
Figure 3C:
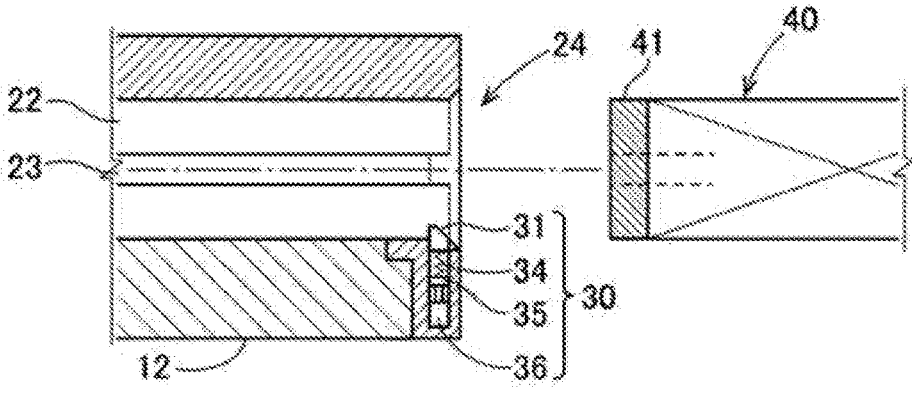
FIG. 3C is a cross-sectional view taken along line 3C-3C in FIG. 3A.

As illustrated in FIG. 1, in a frame structure of electric powered vehicle 10, chassis 11 is constituted by frame 12, and battery 40 is supported on frame 12. Battery 40 mainly supplies power to a driving motor and has a large capacity and a large size.

In electric powered vehicle 10, front wheels 14 are rotatably attached to frame 12 (chassis 11) on the vehicle front side through axle 13, and rear wheels 15 are rotatably attached to frame 12 (chassis 11) on the vehicle rear side through axle 13. Note that, although not illustrated in the drawings, the placement of the driving motor may be in any form, such as a form in which a driving motor is provided to chassis 11 or a so-called in-wheel motor form in which a driving motor is individually provided in each wheel of a vehicle wheel. Further, in the drawings, frame 12 for supporting battery 40 and chassis 11 provided with axle 13 are illustrated as separate bodies for convenience, but frame 12 constitutes chassis 11 and may constitute an entire portion from a portion supporting battery 40 to a portion to which axle 13 is provided.

Further, electric powered vehicle 10 includes front slide rail 21 that is provided on frame 12 between front wheel 14 and rear wheel 15 of electric powered vehicle 10 over the vehicle width direction and guides and supports the front end side of battery 40, and rear slide rail 22 that is provided on frame 12 between front wheel 14 and rear wheel 15 of electric powered vehicle 10 over the vehicle width direction and guides and supports the rear end side of battery 40.

Thus, when replacement of battery 40a (40) that has been set in electric powered vehicle 10 and has a low state of charge is required, battery 40b (40), which is for replacement and has been charged, is inserted from one end side (left side in the vehicle width direction) of front slide rail 21 and rear slide rail 22, and battery 40a (40) (illustrated by an imaginary line) that has a low state of charge and is to be replaced is pushed out from the other end side (right side in the vehicle width direction) of front slide rail 21 and rear slide rail 22, so that battery 40 can be replaced. Further, front slide rail 21 and rear slide rail 22 can enhance the rigidity of frame 12 in the vehicle width direction.

The frame structure of electric powered vehicle 10 further includes battery reinforcement frame 41 that is provided on both sides of battery 40 in the vehicle width direction so as to extend in the vehicle front-rear direction to reinforce battery 40. Battery reinforcement frame 41 is integrally provided in a pack including cells or the like of battery 40. Note that battery reinforcement frame 41 is integrally provided in the battery pack in the present embodiment, but the present disclosure is not limited thereto. Battery reinforcement frame 41 may be provided outside the battery pack and may be of any type as long as battery reinforcement frame 41 can be handled integrally with battery 40.

Next, slide rails and the periphery of the end portions thereof will be described. As illustrated in FIGS. 2A to 2C, and 3A to 3C, front slide rail 21 and rear slide rail 22 each include guide rail 23 that is provided on the inner side where front slide rail 21 and rear slide rail 22 face each other along the vehicle width direction and has a shape of a protruding cross section to guide battery 40. Battery 40 includes slide portion 42 having a groove-shape to slidably engage guide rails 23. This can easily slide and move battery 40 at the time of replacement of battery 40 and hold battery 40 without rattling when battery 40 is set.

Further, the end portions of front slide rail 21 and rear slide rail 22, which are insertion opening 24 and take-out opening 25 for battery 40, each include guide portion 26 that extends outward in the vehicle front-rear direction and height direction to guide battery 40.

As illustrated in FIGS. 2A to 5B, stopper mechanisms 30 that restrict the movement so that battery 40 inserted at the time of replacement of battery 40 does not come out are provided on the end portion sides of front slide rail 21 and rear slide rail 22 in the vehicle width direction.

Stopper mechanism 30 includes: protruding portion 31 that is provided to frame 12 so as to be capable of moving forward and backward in the up-down direction; elastic member (spring) 34 that biases protruding portion 31 upward; elastic-member holding portion 35 that holds elastic member 34; cylinder 36 that moves elastic-member holding portion 35 forward and backward; and a control switch portion (not illustrated) that controls forward/backward movement of cylinder 36.

Note that stopper mechanism 30 is configured with cylinder 36, an electric control switch, and the like in the present embodiment, but the present disclosure is not limited thereto. Stopper mechanism 30 may be configured to move protruding portion 31 forward and backward using a mechanical part, a link, a wire, a spring, and/or the like without cylinder 36 and electric control parts, or may be simply a claw part, and the configuration is not limited as long as stopper mechanism 30 can restrict the movement of battery 40.

Further, stopper mechanism 30 is provided on the end portion side of front slide rail 21 and rear slide rail 22 in the vehicle width direction in the present embodiment, but present disclosure is not limited thereto, and stopper mechanism 30 may be provided in the end portion of battery 40 itself for each battery 40.

Next, the operation of the frame structure of electric powered vehicle 10 when battery 40 is replaced will be described. Note that, for ease of understanding, only battery 40 to be inserted or only battery 40 to be removed is illustrated in the drawings.

First, the side of insertion opening 24 will be described. As illustrated in FIG. 4A, guide portion 26 is formed in insertion opening 24 for battery 40, and protruding portion 31 of stopper mechanism 30 is in a protruding state. In this state, battery 40 that is charged is moved to insertion opening 24. Note that a general-purpose lift, a lifting platform trolley, or the like (not illustrated) may be used for moving battery 40. Further, protruding portion 31 of stopper mechanism 30 is positioned where inclined surface 32 is on the same plane as guide portion 26.

As illustrated in FIG. 4B, when battery 40 is further moved, battery 40 is guided by guide portion 26 and is easily inserted into insertion opening 24. At this time, battery 40 comes into contact with inclined portion 32 of protruding portion 31 that protrudes, and when battery 40 is moved further forward, battery 40 pushes protruding portion 31 down while sliding on inclined portion 32, and is moved still further forward in insertion opening 24. As described above, protruding portion 31 is moved backward (retracted) only by inserting battery 40 on the side of insertion opening 24, and thus battery 40 can be easily inserted.

Figure 5A:
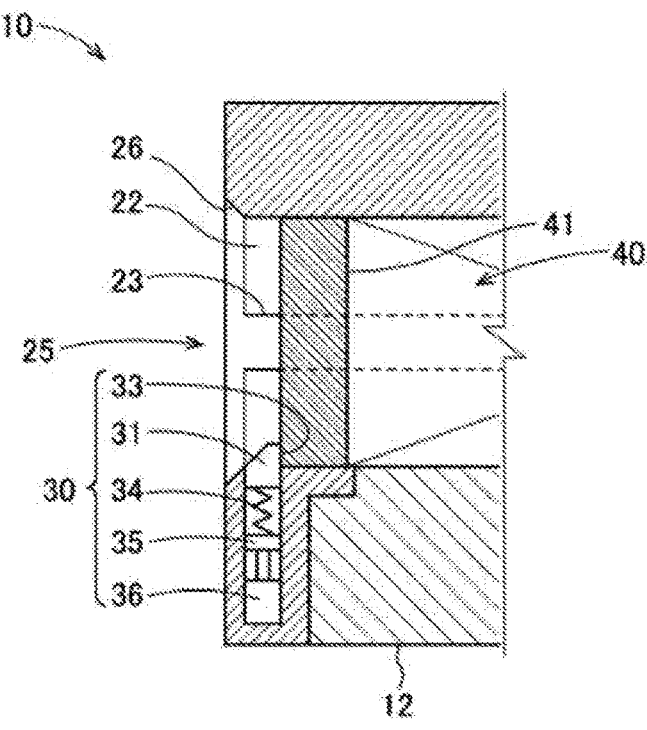
FIG. 5A illustrates an operation on the exit side at the time of insertion of the charged battery according to the embodiment.

Next, the side of take-out opening 25 will be described. As illustrated in FIG. 5A, protruding portion 31 of stopper mechanism 30 protrudes upward in a state before replacement of battery 40. Protruding portion 31 includes stopping surface 33 that rises perpendicularly to the slide-moving direction of battery 40, so that battery 40 comes into contact with stopping surface 33 and the movement is restricted.

Figure 5B:
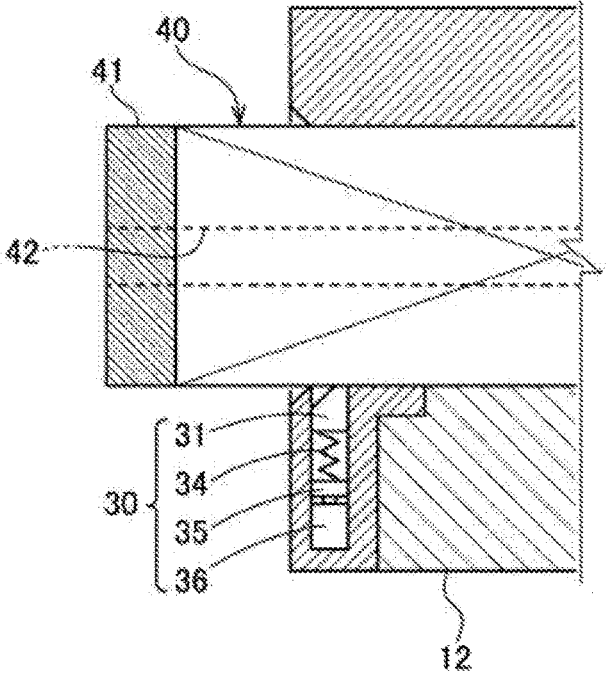
FIG. 5B illustrates an operation on the exit side when a battery having a low state of charge is taken out.

As illustrated in FIG. 5B, when battery 40 is replaced, cylinder 36 is moved backward by operating the control switch portion of stopper mechanism 30. Then, protruding portion 31 is also moved backward and is housed on the side of frame 12, and the movement restriction of battery 40 is released.

When battery 40 that is charged is inserted from the side of insertion opening 24 in this state, battery 40 placed inside and having a low state of charge is pushed out. Accordingly, insertion of battery 40 that is charged and removing of battery 40 having a low power storage rata can be performed simultaneously, and thus battery 40 is replaced one after another, which reduces the number of processes of battery replacement and enhances the work efficiency of battery replacement.

Figure 6:
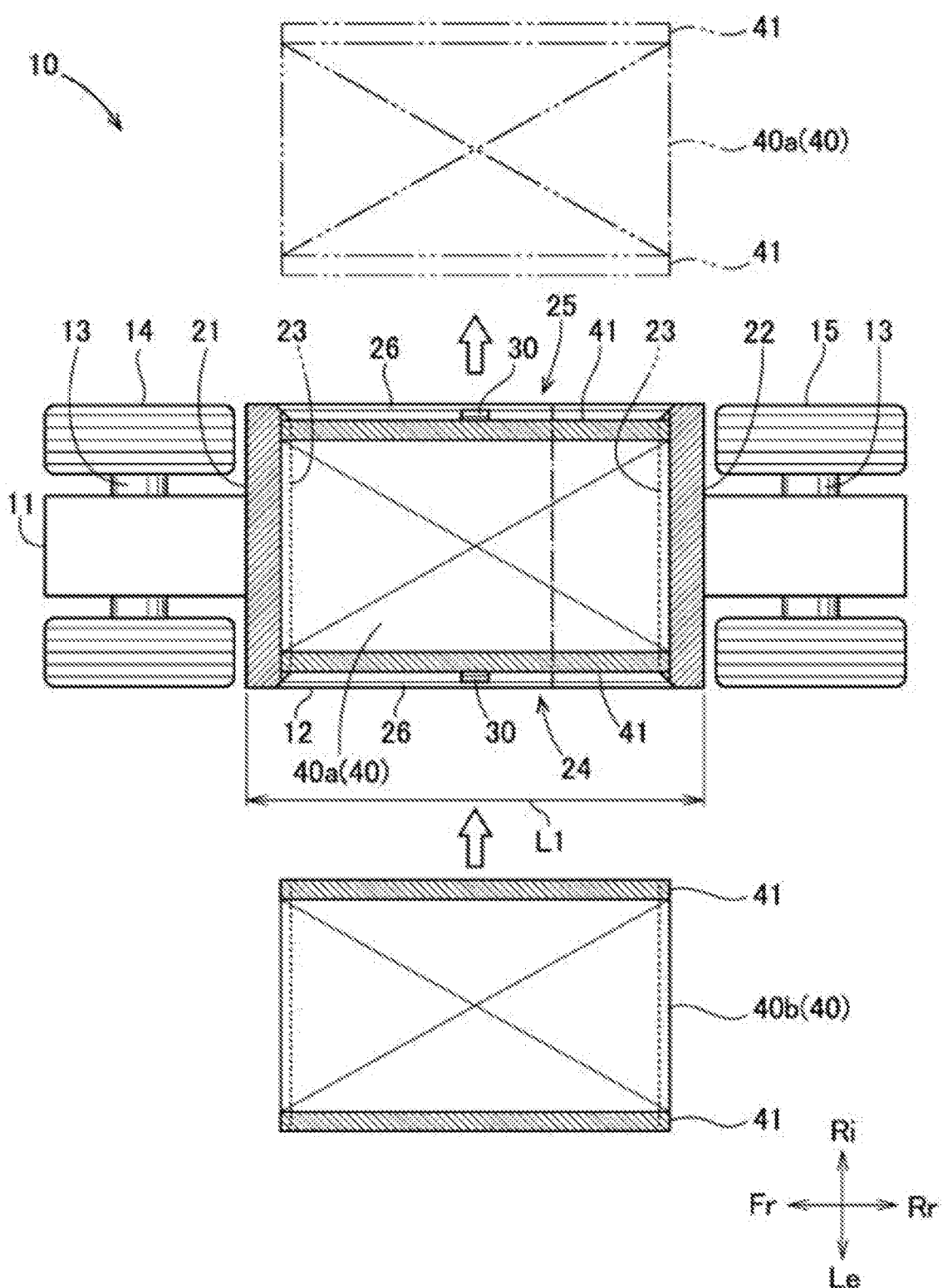
FIG. 6 illustrates battery replacement in a vehicle with a different wheel base length according to the embodiment of the present disclosure.

Next, battery replacement in a vehicle with a different wheel base will be described. As illustrated in FIG. 6, a wheel base of electric powered vehicle 10 is larger than the wheel base of electric powered vehicle 10 illustrated in FIG. 1. Therefore, distance L1 between front slide rail 21 and rear slide rail 22 of electric powered vehicle 10 illustrated in FIG. 6 is also long.

Further, front slide rail 21 and rear slide rail 22 of electric powered vehicle 10 in FIG. 6 are made in common with those of electric powered vehicle 10 in FIG. 1, so that front slide rail 21 and rear slide rail 22 can be shared and used. Thus, the battery capacity is not fixed, and the wheel base of the vehicle can be adjusted by changing the size (capacity) of battery 40. That is, it is possible to correspond to a vehicle with a different wheel base.

The effects of the above-described frame structure of electric powered vehicle 10 will be described. According to the present embodiment, the frame structure of electric powered vehicle 10 includes front slide rail 21 that is provided on frame 12 between front wheel 14 and rear wheel 15 of electric powered vehicle 10 in the vehicle width direction and guides and supports the front end side of battery 40, and rear slide rail 22 that guides and supports the rear end side of battery 40, so that battery 40 is replaceable through front slide rail 21 and rear slide rail 22. Further, battery 40 that is for replacement and charged is inserted from one end side of front slide rail 21 and rear slide rail 22, and battery 40 that has a low state of charge and is to be replaced is pushed out from the other end side of front side rail 21 and rear side rail 22, so that battery 40 can be replaced. Accordingly, insertion of battery 40 that is charged and removing of battery 40 having a low power storage rata can be performed simultaneously, and thus battery 40 is replaced one after another, which reduces the number of processes of battery replacement and enhances the work efficiency of battery replacement.

Further, standardizing front slide rail 21 and rear slide rail 22 in various types of electric powered vehicles allows front slide rail 21 and rear slide rail 22 to be shared and used in various types of electric powered vehicles. Thus, the battery capacity is not fixed, and the wheel base of the vehicle can be adjusted by changing the size (capacity) of battery 40. That is, it is possible to correspond to a vehicle with a different wheel base.

Further, battery reinforcement frame 41 can reinforce the rigidity of battery 40, which makes insertion of battery 40 into front slide rail 21 and rear slide rail 22 easy and enhances the work efficiency of battery replacement. Furthermore, battery reinforcement frame 41 is provided on both sides of battery 40 in the vehicle width direction so as to extend in the vehicle front-rear direction, which enhances the rigidity in the front-rear direction to reinforce the rigidity of frame 12, and the rigidity in the entire vehicle front-rear direction can also be enhanced. That is, battery 20 is integrally structured with frame 12, and battery 20 (the case of the battery pack) also serves as a strength member of frame 12, so that the strength (rigidity) of frame 12 can be enhanced.

Further, guide portion 26 is provided on the end portion of front slide rail 21 and rear slide rail 22 and extends outward in the vehicle front-rear direction and height direction to guide battery 40, so that even battery 40 having a large size for a driving motor can be guided by guide section 26 and easily inserted between front slide rail 21 and rear slide rail 22. Thus, the work efficiency of battery replacement can be enhanced.

Stopper mechanism 30 for restricting the movement is provided on the end portion side of front slide rail 21 and rear slide rail 22 in the vehicle width direction, or in the end portion of battery 40 in the vehicle width direction, so that it is possible to avoid coming out of battery 40 inserted at the time of battery replacement and to easily replace the battery. As a result, the work efficiency of the battery replacement can be enhanced.

Note that front slide rail 21 and rear slide rail 22 are placed along the vehicle width direction, but the present disclosure is not limited thereto. Front slide rail 21 and rear slide rail 22 may be placed in the vehicle front-rear direction (in this case, left slide rail and right slide rail, respectively), and battery 40 that is charged may be inserted in the vehicle front-rear direction, and battery 40 having a low state of charge may be pushed out and taken out.

That is, the present disclosure is not limited to the above-described embodiment as long as the operation and effects of the present disclosure are achieved.

INDUSTRIAL APPLICABILITY

The present disclosure is used for a frame structure for supporting a battery of an electric powered vehicle in which the battery of an electric motor for traveling is replaceably mounted.

The invention claimed is:

1. A frame structure mounted on an electric powered vehicle, the frame structure comprising:
    a front slide rail that is provided on a frame of the electric powered vehicle between a front wheel and a rear wheel of the electric powered vehicle over a vehicle width direction and supports a front end side of a battery;
    a rear slide rail that is provided on the frame between the front wheel and the rear wheel of the electric powered vehicle over the vehicle width direction and supports a rear end side of the battery;
    a pair of side plate portions that are provided on the left and right ends of the front and rear slide rails, and form an opening that opens in the vehicle width direction between the front and rear slide rails;
    a guide portion that is formed at least on one end side of the opening in the side plate portions, expands the opening in the vehicle front-rear direction and a height direction toward an outside in the vehicle width direction; and
    a stopper mechanism that is provided on each of the side plate portions, and restricts movement of the battery inserted during replacement of the battery;
    wherein the stopper mechanism in each of the side plate portions comprises:
    a protrusion that protrudes from the inside of the corresponding side plate portion into the opening and is movable up and down, and has an inclined surface facing the outside of the opening and a stopping surface facing the inside of the opening;
    an elastic member that urges the protrusion upward;
    an elastic member support that holds the elastic member from below;
    a cylinder that moves the elastic member support forward and backward; and
    a control switch that controls the movement of the cylinder, and
    wherein the battery is replaced by inserting the battery for replacement from one end side of the opening and pushing out the battery to be replaced from the other end side of the opening.

2. The frame structure according to claim 1, further comprising a battery reinforcement frame that is provided on both ends of the battery in the vehicle width direction so as to extend in a vehicle front-rear direction to reinforce the battery.

* * * * *